(12) United States Patent
Byrne et al.

(10) Patent No.: US 10,318,877 B2
(45) Date of Patent: Jun. 11, 2019

(54) COHORT-BASED PREDICTION OF A FUTURE EVENT

(75) Inventors: Daniel J. Byrne, New York, NY (US); Mark W. Byrne, New York, NY (US); Robert R. Friedlander, Southbury, CT (US); Richard Hennessy, Austin, TX (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 960 days.

(21) Appl. No.: 13/275,483

(22) Filed: Oct. 18, 2011

(65) Prior Publication Data
US 2012/0095948 A1 Apr. 19, 2012

Related U.S. Application Data

(63) Continuation-in-part of application No. 12/907,346, filed on Oct. 19, 2010.

(51) Int. Cl.
*G06N 7/00* (2006.01)

(52) U.S. Cl.
CPC .................................. *G06N 7/005* (2013.01)

(58) Field of Classification Search
CPC ........ G16H 50/20; G16H 50/50; G16H 50/70; G06F 19/324; G06F 19/3418
USPC ...................................................... 705/3, 2
See application file for complete search history.

(56) References Cited

U.S. PATENT DOCUMENTS

| 4,328,978 A | 5/1982 | McLaughlin |
| 4,551,842 A | 12/1985 | Segarra |
| 4,742,388 A | 5/1988 | Cooper et al. |
| 4,841,526 A | 6/1989 | Wilson et al. |

(Continued)

FOREIGN PATENT DOCUMENTS

| EP | 0772367 | 5/1997 |
| EP | 0959635 | 11/1999 |

(Continued)

OTHER PUBLICATIONS

U.S. Appl. No. 12/907,346: Final Office Action dated January 22, 2013.

(Continued)

*Primary Examiner* — Reginald R Reyes
(74) *Attorney, Agent, or Firm* — Law Office of Jim Boice

(57) ABSTRACT

A processor-implemented method, computer program product, and/or computer system predicts a future event. A first bit array, which describes characteristics of a single entity while experiencing a first event, is generated using values received from a set of physical test devices. After the first single entity experiences a different second event, a second bit array is generated from another set of physical test devices. The second bit array describes characteristics of an event cohort, which is made up of entities, other than the single entity, which also experience the second event, but which never experienced the first event. When another single entity experiences the first event, a determination is made as to whether that other single entity has characteristics from both the first bit array and the second bit array. If so, a prediction is made that the other single entity will also experience the second event.

9 Claims, 3 Drawing Sheets

(56) References Cited

U.S. PATENT DOCUMENTS

| | | |
|---|---|---|
| 4,890,227 A | 12/1989 | Watanabe et al. |
| 5,036,462 A | 7/1991 | Kaufman et al. |
| 5,070,453 A | 12/1991 | Duffany |
| 5,128,871 A | 7/1992 | Schmitz |
| 5,237,429 A | 8/1993 | Zuiss et al. |
| 5,406,626 A | 4/1995 | Ryan |
| 5,455,868 A | 10/1995 | Sergent et al. |
| 5,524,051 A | 6/1996 | Ryan |
| 5,550,021 A | 8/1996 | Blum et al. |
| 5,491,838 A | 11/1996 | Takahisa |
| 5,577,266 A | 11/1996 | Takahisa et al. |
| 5,590,195 A | 12/1996 | Ryan |
| 5,613,194 A | 3/1997 | Olds et al. |
| 5,642,397 A | 6/1997 | Agbaje-Anozie |
| 5,659,596 A | 8/1997 | Dunn |
| 5,664,109 A | 9/1997 | Johnson et al. |
| 5,692,446 A | 12/1997 | Becker et al. |
| 5,692,501 A | 12/1997 | Minturn |
| 5,745,532 A | 4/1998 | Campana, Jr. |
| 5,751,806 A | 5/1998 | Ryan |
| 5,764,740 A | 6/1998 | Holender |
| 5,774,569 A | 6/1998 | Waldenmaier |
| 5,781,704 A | 7/1998 | Rossmo |
| 5,809,472 A | 9/1998 | Morrison |
| 5,815,971 A | 10/1998 | Rothe et al. |
| 5,825,755 A | 10/1998 | Thompson et al. |
| 5,838,918 A | 11/1998 | Prager et al. |
| 5,880,598 A | 3/1999 | Duong |
| 5,889,474 A | 3/1999 | Ladue |
| 5,911,132 A | 6/1999 | Sloane |
| 5,926,624 A | 7/1999 | Katz et al. |
| 5,930,350 A | 7/1999 | Johnson |
| 5,965,352 A | 10/1999 | Stoughton et al. |
| 5,967,981 A | 10/1999 | Watrous |
| 5,974,312 A | 10/1999 | Hayes, Jr. et al. |
| 5,982,281 A | 11/1999 | Layson, Jr. |
| 6,021,403 A | 2/2000 | Horvitz et al. |
| 6,054,928 A | 4/2000 | Lemelson et al. |
| 6,058,391 A | 5/2000 | Gardner |
| 6,076,166 A | 6/2000 | Moshfeghi et al. |
| 6,119,096 A | 9/2000 | Mann et al. |
| 6,167,405 A | 12/2000 | Rosensteel et al. |
| 6,178,141 B1 | 1/2001 | Duckworth et al. |
| 6,189,004 B1 | 2/2001 | Rassen et al. |
| 6,192,340 B1 | 2/2001 | Abecassis |
| 6,212,524 B1 | 4/2001 | Weissman et al. |
| 6,216,134 B1 | 4/2001 | Heckerman et al. |
| 6,242,186 B1 | 6/2001 | Salonen |
| 6,269,365 B1 | 7/2001 | Kiyoki et al. |
| 6,278,999 B1 | 8/2001 | Knapp |
| 6,285,886 B1 | 9/2001 | Kamel et al. |
| 6,321,207 B1 | 11/2001 | Ye |
| 6,353,818 B1 | 3/2002 | Carino, Jr. |
| 6,370,931 B2 | 4/2002 | Bennett |
| 6,377,993 B1 | 4/2002 | Brandt et al. |
| 6,385,604 B1 | 5/2002 | Bakalash et al. |
| 6,484,155 B1 | 11/2002 | Kiss et al. |
| 6,506,384 B1 | 1/2003 | Laal et al. |
| 6,509,898 B2 | 1/2003 | Chi et al. |
| 6,553,336 B1 | 4/2003 | Johnson et al. |
| 6,563,804 B1 | 5/2003 | Iyer et al. |
| 6,578,043 B2 | 6/2003 | Nye |
| 6,581,037 B1 | 6/2003 | Pak |
| 6,606,625 B1 | 8/2003 | Muslea et al. |
| 6,629,106 B1 | 9/2003 | Narayanaswamy et al. |
| 6,646,676 B1 | 11/2003 | Dagraca et al. |
| 6,662,141 B2 | 12/2003 | Kaub |
| 6,675,159 B1 | 1/2004 | Lin et al. |
| 6,714,979 B1 | 3/2004 | Brandt et al. |
| 6,795,808 B1 | 9/2004 | Strubbe et al. |
| 6,823,818 B2 | 11/2004 | Van Den Berg et al. |
| 6,826,568 B2 | 11/2004 | Bernstein et al. |
| 6,829,604 B1 | 12/2004 | Tifft |
| 6,905,816 B2 | 6/2005 | Jacobs et al. |
| 6,937,147 B2 | 8/2005 | Dilbeck et al. |
| 6,941,311 B2 | 9/2005 | Shah et al. |
| 6,954,736 B2 | 10/2005 | Menninger et al. |
| 6,963,826 B2 | 11/2005 | Hanaman et al. |
| 6,965,816 B2 | 11/2005 | Walker |
| 6,972,687 B1 | 12/2005 | Marshall et al. |
| 6,978,268 B2 | 12/2005 | Thomas et al. |
| 6,996,567 B2 | 2/2006 | Ghukasyan |
| 7,019,740 B2 | 3/2006 | Georgalas |
| 7,047,253 B1 | 5/2006 | Murthy et al. |
| 7,072,794 B2 | 7/2006 | Wittkowski |
| 7,080,081 B2 | 7/2006 | Agarwal et al. |
| 7,089,250 B2 | 8/2006 | Dognata et al. |
| 7,111,010 B2 | 9/2006 | Chen |
| 7,113,993 B1 | 9/2006 | Cappiello et al. |
| 7,152,070 B1 | 12/2006 | Musick et al. |
| 7,179,645 B2 | 2/2007 | Humphreys et al. |
| 7,181,428 B2 | 2/2007 | Lawrence |
| 7,191,183 B1 | 3/2007 | Goldstein |
| 7,213,009 B2 | 5/2007 | Pestotnik et al. |
| 7,230,930 B2 | 6/2007 | Ahya et al. |
| 7,240,330 B2 | 7/2007 | Fairweather |
| 7,295,925 B2 | 11/2007 | Breed et al. |
| 7,308,385 B2 | 12/2007 | Wegerich et al. |
| 7,337,146 B2 | 2/2008 | Heelan et al. |
| 7,346,492 B2 | 3/2008 | Shaw |
| 7,363,309 B1 | 4/2008 | Waite et al. |
| 7,403,922 B1 | 7/2008 | Lewis et al. |
| 7,433,853 B2 | 10/2008 | Brockway et al. |
| 7,457,731 B2 | 11/2008 | Rao |
| 7,457,810 B2 | 11/2008 | Breining et al. |
| 7,500,150 B2 | 3/2009 | Sharma et al. |
| 7,516,142 B2 | 4/2009 | Friedlander et al. |
| 7,523,118 B2 | 4/2009 | Friedlander et al. |
| 7,526,467 B2 | 4/2009 | Fogel |
| 7,533,113 B1 | 5/2009 | Haddad |
| 7,538,658 B2 | 5/2009 | Twitchell |
| 7,543,149 B2 | 6/2009 | Ricciardi et al. |
| 7,548,874 B2 | 6/2009 | Kanevsky et al. |
| 7,580,922 B2 | 8/2009 | Friedlander et al. |
| 7,630,330 B2 | 8/2009 | Friedlander et al. |
| 7,584,160 B2 | 9/2009 | Friedlander et al. |
| 7,584,280 B2 | 9/2009 | Kim et al. |
| 7,606,772 B2 | 10/2009 | Flinn et al. |
| 7,630,948 B2 | 12/2009 | Friedlander et al. |
| 7,631,222 B2 | 12/2009 | Hasan et al. |
| 7,634,109 B2 | 12/2009 | Steinberg et al. |
| 7,647,286 B2 | 1/2010 | Friedlander et al. |
| 7,647,288 B2 | 1/2010 | Friedlander et al. |
| 7,653,609 B2 | 1/2010 | Friedlander et al. |
| 7,667,596 B2 | 2/2010 | Ozdemir et al. |
| 7,676,390 B2 | 3/2010 | Senturk et al. |
| 7,683,929 B2 | 3/2010 | Elazar et al. |
| 7,685,083 B2 | 3/2010 | Fairweather |
| 7,693,766 B2 | 4/2010 | Horowitz |
| 7,698,246 B2 | 4/2010 | Friedlander et al. |
| 7,702,605 B2 | 4/2010 | Friedlander et al. |
| 7,755,480 B2 | 7/2010 | Aritsuka et al. |
| 7,761,440 B2 | 7/2010 | Chow et al. |
| 7,779,051 B2 | 8/2010 | Friedlander et al. |
| 7,788,213 B2 | 8/2010 | Friedlander et al. |
| 7,792,783 B2 | 9/2010 | Friedlander et al. |
| 7,805,391 B2 | 9/2010 | Friedlander et al. |
| 7,809,660 B2 | 10/2010 | Friedlander et al. |
| 7,840,515 B2 | 11/2010 | Ozdemir et al. |
| 7,840,897 B2 | 11/2010 | Ancier |
| 7,846,020 B2 | 12/2010 | Walker et al. |
| 7,921,036 B1 | 4/2011 | Sharma et al. |
| 7,930,204 B1 | 4/2011 | Sharma et al. |
| 7,953,686 B2 | 5/2011 | Angell et al. |
| 7,974,869 B1 | 7/2011 | Sharma et al. |
| 8,000,777 B2 | 8/2011 | Jaeb et al. |
| 8,041,516 B2 | 10/2011 | Angell et al. |
| 8,117,144 B2 | 2/2012 | Angell et al. |
| 2001/0051881 A1 | 12/2001 | Filler |
| 2002/0004782 A1 | 1/2002 | Cincotta |
| 2002/0049772 A1 | 4/2002 | Rienhoff et al. |
| 2002/0052756 A1 | 5/2002 | Lomangino |
| 2002/0059183 A1 | 5/2002 | Chen |
| 2002/0099691 A1 | 7/2002 | Lore et al. |

(56) References Cited

U.S. PATENT DOCUMENTS

| | | |
|---|---|---|
| 2002/0099692 A1 | 7/2002 | Shah et al. |
| 2002/0107641 A1 | 8/2002 | Schaeffer et al. |
| 2002/0107824 A1 | 8/2002 | Ahmed |
| 2002/0111922 A1 | 8/2002 | Young et al. |
| 2002/0147617 A1 | 10/2002 | Schoenbaum et al. |
| 2002/0156791 A1 | 10/2002 | Nesamoney et al. |
| 2002/0176604 A1 | 11/2002 | Shekhar et al. |
| 2002/0183971 A1 | 12/2002 | Wegerich et al. |
| 2002/0184225 A1 | 12/2002 | Ghukasyan |
| 2002/0184401 A1 | 12/2002 | Kadel et al. |
| 2002/0194117 A1 | 12/2002 | Nabe et al. |
| 2003/0014400 A1 | 1/2003 | Siegel |
| 2003/0023612 A1 | 1/2003 | Carlbom et al. |
| 2003/0033263 A1 | 2/2003 | Cleary |
| 2003/0036903 A1 | 2/2003 | Konopka et al. |
| 2003/0065535 A1* | 4/2003 | Karlov .................. G06Q 50/22 705/2 |
| 2003/0074222 A1 | 4/2003 | Rosow et al. |
| 2003/0088438 A1 | 5/2003 | Maughan et al. |
| 2003/0088463 A1 | 5/2003 | Kanevsky et al. |
| 2003/0126148 A1 | 7/2003 | Gropper et al. |
| 2003/0131362 A1 | 7/2003 | Jasinschi et al. |
| 2003/0140063 A1 | 7/2003 | Pizzorno et al. |
| 2003/0169907 A1 | 9/2003 | Edwards et al. |
| 2003/0171876 A1 | 9/2003 | Markowitz et al. |
| 2003/0174773 A1 | 9/2003 | Comaniciu et al. |
| 2003/0177132 A1 | 9/2003 | Thomas et al. |
| 2003/0191699 A1 | 10/2003 | Deveault et al. |
| 2003/0195898 A1 | 10/2003 | Agarwal et al. |
| 2003/0231769 A1 | 12/2003 | Bolle et al. |
| 2003/0236822 A1 | 12/2003 | Graupner et al. |
| 2004/0006532 A1 | 1/2004 | Lawrence et al. |
| 2004/0024675 A1 | 2/2004 | Lahre et al. |
| 2004/0054144 A1 | 3/2004 | Itai |
| 2004/0064341 A1 | 4/2004 | Langan et al. |
| 2004/0095617 A1 | 5/2004 | Mangerson |
| 2004/0122787 A1 | 5/2004 | Avinash et al. |
| 2004/0122719 A1 | 6/2004 | Sabol et al. |
| 2004/0147817 A1 | 7/2004 | Dewing et al. |
| 2004/0161133 A1 | 8/2004 | Elazar et al. |
| 2004/0174597 A1 | 9/2004 | Craig et al. |
| 2004/0181376 A1 | 9/2004 | Fables et al. |
| 2004/0193572 A1 | 9/2004 | Leary |
| 2004/0215626 A1 | 10/2004 | Colossi et al. |
| 2004/0215981 A1 | 10/2004 | Ricciardi et al. |
| 2004/0225202 A1 | 11/2004 | Skinner |
| 2004/0240542 A1 | 12/2004 | Yeredor et al. |
| 2004/0249650 A1 | 12/2004 | Freedman et al. |
| 2004/0249678 A1 | 12/2004 | Henderson |
| 2005/0004823 A1 | 1/2005 | Hnatio |
| 2005/0018861 A1 | 1/2005 | Tashev |
| 2005/0038608 A1 | 2/2005 | Chandra et al. |
| 2005/0043060 A1 | 2/2005 | Brandenberg et al. |
| 2005/0049988 A1 | 3/2005 | Dahlquist et al. |
| 2005/0050068 A1 | 3/2005 | Vaschillo et al. |
| 2005/0102210 A1 | 5/2005 | Song et al. |
| 2005/0125325 A1 | 6/2005 | Chat et al. |
| 2005/0144062 A1 | 6/2005 | Mittal et al. |
| 2005/0149466 A1 | 7/2005 | Hale et al. |
| 2005/0165594 A1 | 7/2005 | Chandra et al. |
| 2005/0169367 A1 | 8/2005 | Venetianer et al. |
| 2005/0187437 A1 | 8/2005 | Matsugu et al. |
| 2005/0216273 A1 | 9/2005 | Reding et al. |
| 2005/0246189 A1 | 11/2005 | Monitzer et al. |
| 2006/0000420 A1 | 1/2006 | Davies |
| 2006/0004582 A1 | 1/2006 | Claudatos et al. |
| 2006/0004609 A1 | 1/2006 | Kenneth et al. |
| 2006/0069514 A1 | 3/2006 | Chow et al. |
| 2006/0111961 A1 | 5/2006 | McQuivey |
| 2006/0149705 A1 | 7/2006 | Friedlander et al. |
| 2006/0161392 A1 | 7/2006 | Sholl et al. |
| 2006/0184483 A1 | 8/2006 | Clark et al. |
| 2006/0206379 A1 | 9/2006 | Rosenberg |
| 2006/0218010 A1 | 9/2006 | Mignon et al. |
| 2006/0251339 A1 | 11/2006 | Gokturk et al. |
| 2006/0259329 A1* | 11/2006 | Kline .................. G06F 17/18 705/3 |
| 2006/0282222 A1 | 12/2006 | Mitsuyama et al. |
| 2006/0287890 A1 | 12/2006 | Stead et al. |
| 2007/0011134 A1 | 1/2007 | Langseth et al. |
| 2007/0013776 A1 | 1/2007 | Venetianer et al. |
| 2007/0027636 A1 | 2/2007 | Rabinowitz |
| 2007/0027674 A1 | 2/2007 | Parson et al. |
| 2007/0054282 A1 | 3/2007 | Liew |
| 2007/0061287 A1 | 3/2007 | Le et al. |
| 2007/0073654 A1 | 3/2007 | Chow et al. |
| 2007/0106478 A1 | 5/2007 | Jung et al. |
| 2007/0122003 A1 | 5/2007 | Dobkin et al. |
| 2007/0174090 A1 | 7/2007 | Friedlander et al. |
| 2007/0174091 A1 | 7/2007 | Friedlander et al. |
| 2007/0185586 A1 | 8/2007 | Al-Attar et al. |
| 2007/0185737 A1 | 8/2007 | Friedlander et al. |
| 2007/0203872 A1 | 8/2007 | Flinn et al. |
| 2007/0225577 A1 | 9/2007 | Mathan |
| 2007/0230270 A1 | 10/2007 | Calhoun |
| 2007/0233631 A1 | 10/2007 | Kobayashi et al. |
| 2007/0244701 A1 | 10/2007 | Erlanger et al. |
| 2007/0274337 A1 | 11/2007 | Purpura |
| 2007/0276851 A1 | 11/2007 | Friedlander et al. |
| 2007/0299691 A1 | 12/2007 | Friedlander et al. |
| 2008/0004793 A1 | 1/2008 | Horvitz et al. |
| 2008/0004951 A1 | 1/2008 | Huang et al. |
| 2008/0015871 A1 | 1/2008 | Eder |
| 2008/0024299 A1 | 1/2008 | Robertson |
| 2008/0031491 A1 | 2/2008 | Ma et al. |
| 2008/0033253 A1* | 2/2008 | Neville ............... G06F 19/3481 600/300 |
| 2008/0055049 A1 | 3/2008 | Weill et al. |
| 2008/0067244 A1 | 3/2008 | Marks |
| 2008/0071162 A1 | 3/2008 | Jaeb et al. |
| 2008/0077463 A1 | 3/2008 | Friedlander et al. |
| 2008/0082356 A1 | 4/2008 | Friedlander et al. |
| 2008/0082374 A1 | 4/2008 | Kennis et al. |
| 2008/0082399 A1 | 4/2008 | Noble et al. |
| 2008/0092245 A1 | 4/2008 | Alward et al. |
| 2008/0098456 A1 | 4/2008 | Alward et al. |
| 2008/0109398 A1 | 5/2008 | Harter |
| 2008/0114724 A1 | 5/2008 | Indeck et al. |
| 2008/0208801 A1 | 8/2008 | Friedlander et al. |
| 2008/0208813 A1 | 8/2008 | Friedlander et al. |
| 2008/0208814 A1 | 8/2008 | Friedlander et al. |
| 2008/0208832 A1 | 8/2008 | Friedlander et al. |
| 2008/0208838 A1 | 8/2008 | Friedlander et al. |
| 2008/0208901 A1 | 8/2008 | Friedlander et al. |
| 2008/0208902 A1 | 8/2008 | Friedlander et al. |
| 2008/0208903 A1 | 8/2008 | Friedlander et al. |
| 2008/0208904 A1 | 8/2008 | Friedlander et al. |
| 2008/0228577 A1 | 9/2008 | Decre et al. |
| 2008/0228747 A1 | 9/2008 | Thrall et al. |
| 2008/0240496 A1 | 10/2008 | Senior |
| 2008/0243439 A1 | 10/2008 | Runkle et al. |
| 2008/0254481 A1* | 10/2008 | Love .................. G01N 33/564 435/7.1 |
| 2008/0260212 A1 | 10/2008 | Moskal et al. |
| 2008/0262743 A1 | 10/2008 | Lewis et al. |
| 2008/0270398 A1 | 10/2008 | Landau et al. |
| 2008/0294459 A1 | 11/2008 | Angell et al. |
| 2008/0294692 A1 | 11/2008 | Angell et al. |
| 2008/0306895 A1 | 12/2008 | Karty |
| 2008/0317292 A1 | 12/2008 | Baker et al. |
| 2009/0002155 A1 | 1/2009 | Ma et al. |
| 2009/0024553 A1 | 1/2009 | Angell et al. |
| 2009/0043593 A1 | 2/2009 | Herbrich et al. |
| 2009/0070138 A1 | 3/2009 | Langheier et al. |
| 2009/0092283 A1 | 4/2009 | Whillock et al. |
| 2009/0106179 A1 | 4/2009 | Friedlander et al. |
| 2009/0109795 A1 | 4/2009 | Marti |
| 2009/0164302 A1 | 6/2009 | Jung et al. |
| 2009/0171783 A1 | 7/2009 | Raju |
| 2009/0185723 A1 | 7/2009 | Kurtz et al. |
| 2009/0195401 A1 | 8/2009 | Maroney et al. |
| 2009/0231436 A1 | 9/2009 | Faltesek et al. |
| 2009/0240523 A1 | 9/2009 | Friedlander et al. |
| 2009/0273468 A1 | 11/2009 | Mazar et al. |

(56) References Cited

U.S. PATENT DOCUMENTS

| | | | |
|---|---|---|---|
| 2009/0287503 A1 | 11/2009 | Angell et al. | |
| 2009/0299766 A1 | 12/2009 | Friedlander et al. | |
| 2010/0008515 A1 | 1/2010 | Fulton et al. | |
| 2010/0035244 A1* | 2/2010 | Brody | C12Q 1/6886 435/6.14 |
| 2010/0131206 A1 | 5/2010 | Angell et al. | |
| 2010/0131263 A1 | 5/2010 | Angell et al. | |
| 2010/0131502 A1 | 5/2010 | Fordham | |
| 2010/0148970 A1 | 6/2010 | Angell et al. | |
| 2010/0150457 A1 | 6/2010 | Angell et al. | |
| 2010/0150458 A1 | 6/2010 | Angell et al. | |
| 2010/0153133 A1 | 6/2010 | Angell et al. | |
| 2010/0153146 A1 | 6/2010 | Angell et al. | |
| 2010/0153147 A1 | 6/2010 | Angell et al. | |
| 2010/0153174 A1 | 6/2010 | Angell et al. | |
| 2010/0153180 A1 | 6/2010 | Angell et al. | |
| 2010/0153353 A1 | 6/2010 | Angell et al. | |
| 2010/0153389 A1 | 6/2010 | Angell et al. | |
| 2010/0153390 A1 | 6/2010 | Angell et al. | |
| 2010/0153458 A1 | 6/2010 | Angell et al. | |
| 2010/0153470 A1 | 6/2010 | Angell et al. | |
| 2010/0153597 A1 | 6/2010 | Angell et al. | |
| 2010/0177169 A1 | 7/2010 | Saric | |
| 2010/0177950 A1* | 7/2010 | Donovan | G16H 50/30 702/19 |
| 2010/0207874 A1 | 8/2010 | Yuxin et al. | |

FOREIGN PATENT DOCUMENTS

| | | |
|---|---|---|
| JP | 8316872 | 11/1996 |
| JP | 2002312373 | 10/2002 |
| JP | 2002342484 | 11/2002 |
| KR | 20080082924 | 9/2008 |
| WO | 9419571 | 9/1994 |
| WO | 9726718 | 7/1997 |
| WO | 0100807 | 1/2001 |
| WO | 0108077 | 2/2001 |

OTHER PUBLICATIONS

U.S. Appl. No. 12/907,346: Non-Final Office Action dated June 4, 2012.
Yalch et al., "The Effects of Music in a Retail Setting on Real and Perceived Shopping Times," Journal of Business Research 49, pp. 139-147, 2000.
Ahmad et al., "An Artificial Neural Network Model for Generating Hydrograph Fron Hydrometeorological Parameters," Dept of Civil, Architectural and Environmental Engineering, University of Miami, Mar. 31, 2005 (Abstract Only).
Dept of Health and Human Services Agency for Healthcare Research and Quality, "AHRQ Quality Indicators—Patient Safety Indicators—Technical Specifications," 2012, pp. 1-149. http://www.qualityindicators.ahrq.gov.
J. Altmann et al., "Cooperative Software Development: Concepts, Model and Tools," Technology of Object-Oriented Languages and Systems, 1999, pp. 1-14.
R. Beaglehole, "Men Aging and Health: Achieving Health Across the Life Span," Second World Congress on the Ageing Male, World Health Organization, Feb. 2000, pp. 1-63.
M. Bitner, "The Impact of Physical Surroundings on Customer and Employees," Journal of Marketing, vol. 56, pp. 57-71, Apr. 1992.
M. Borg et al., "Video Surveillance for Aircraft Activity Monitoring", IEEE Conference on Advanced Video and Signal Based Surveillance, 2005, pp. 1-6.
Brown et al., "IBM Smart Surveillance System (S3): An Open and Extensible Architecture for Smart Video Surveillance," pp. 1-4, IBM TJ Watson Research Center.
Wong et al., "Rule-Based Anomaly Pattern Detection for Detecting Disease Outbreaks," AAAI-02 Proceedings, 2002, pp. 1-7.
Ming Chen et al., "Research on Organization Method of Development Activities for Complicated Product," Computer Supported Cooperative Work in Design, 2005. Proceedings of the Ninth International Conference on, vol. 1, pp. 234-239 (Abstract).
Shou-Qi Cao et al., "Research on Resource Scheduling for Development Process of Complicated Product," Computer Supported Cooperative Work in Design, 2005. Proceedings of the Ninth International Conference on, vol. 1, pp. 229-233 (Abstract).
J. Davis et al., "An Adaptive Focus-of-Attention Model for Video Surveillance and Monitoring", Machine Vision and Applications No. 18, 2007, pp. 41-64.
Knowledge@Wharton, Tag Team, "Tracking the Pattern of Supermarket Shoppers," Published Jun. 1, 2005.
Girgensohn et al., "Determining Activity Patterns in Retail Spaces Through Video Analysis," MM'08, Oct. 26-31, 2008.
Kun Wang et al., "A Mathematical Approach to Disaster Recovery Planning," Proceedings of the First International Conference on Semantics, Knowledge, and Grid, 2005, pp. 1-3 (Abstract).
Goodwin, et al., "Data Mining for Preterm Birth Prediction," 2000, pp. 46-51, ACM.
AAFP, "Graham Center One-Pager, Types of Medical Errors Commonly Reported by Family Physicians", Am Fam Physician, Feb. 2003.
Grimson et al., "The SI Challenge in Health Care," Communications of the ACM, Jun. 2000, pp. 49-55, ACM.
Grzymala-Busse, "Knowledge Acquisition Under Uncertainty—A Rough Set Approach," Journal of Intelligent and Robotic Systems, 1988 (Abstract).
Gulas et al., "Right Under Our Noses: Ambient Scent and Consumer Responses," Journal of Business and Psychology, Fall 1995.
Han, et al., "Discovery of Multiple-Level Association Rules From Large Databases," Proceedings of the 1995 International Conference for Very Large Data Bases, 1995. pp. 420-431.
Hashemi et al, "Development of Group's Signature for Evaluation of Skin Cancer in Mice Caused by Ultraviolet Radiation," Proceedings of the International Conference of Information Technology: Computers and Communications, ITCC 2003, IEEE Computer Society, Washington, DC, USA, Apr. 28-30, 2003, pp. 1-4 (Abstract Only).
Phillip E. Hayes et al., "Picking Up the Pieces: Utilizing Disaster Recovery Project Management to Improve Readiness and Response Time," IEEE Industry Applications Magazine, Nov./Dec. 2002, pp. 1-10 (Abstract).
L. Herbert, "Othello Error: Facial Profiling, Privacy, and the Suppression of Dissent", Ohio State Journal of Criminal Law, vol. 5, 2007, pp. 79-129.
Hoshiai et al., "Sion Architecture: Sematic Information-Oriented Network Architecture", Transaction of the Institute of Electronics, Information and Communication Engineers, vol. J84-B, No. 3, pp. 411-424, Mar. 2001, Abstract Only.
Hsinchun Chen, "Machine Learning for Information Retrieval: Neural Networks, Symbolic Learning, and Genetic Algorithms," Journal of the American Society for Information Science, Apr. 1995, pp. 194-216.
Johansson et al., "Visual Analysis Based on Algorithmic Classification," Proceedings of the Seventh International Conference on Information Visualization, London, England, Jul. 16-18, 2003, pp. 1-4 (Abstract Only).
Kiang, "Extending the Kohonen Self-Organizing Map Networks for Clustering Analysis," Journal, Computational Statistics & Data Analysis, vol. 38, December 2, 2001, pp. 161-180.
C. Larson et al., "The Shape of Threat: Simple Geometric Forms Evoke Rapid and Sustained Capture of Attention", Emotion 2007, Vol. 7, No. 3, pp. 526-534.
E. Lin and L. Haas., "IBM Federated Database Technology," Mar. 1, 2002, IBM Developerworks Library, pp. 1-9.
Lowery et al., "Barriers to Implementing Simulation in Health Care," Proceedings From the 1994 Winter Simulation Conference, pp. 868-875 (Abstract Only).
Luckham et al., "Event Processing Glossary," Jul. 2008, pp. 1-19. http://complexevents.com.
Lurie, "The Federation Database Interoperability," Apr. 24, 2003, IBM Developerworks Library, pp. 1-12.

(56) References Cited

OTHER PUBLICATIONS

Lymberopoulos et al., "An Easy-to-Program Sensor System for Parsing Out Human Activities," Embedded Networks and Application Lab, Enalab, Yale University, New Haven, CT, 2008, pp. 1-17.
Y. Matsushita et al., "Illumination Normalization With Time-Dependent Intrinsic Images for Video Surveillance", IEEE Transactions on Pattern Analysis and Machine Intelligence, vol. 26, Issue 10, Oct. 2004, pp. 1336-1347.
McShan et al, "Pathminer: Predicting Metabolic Pathways by Heuristic Search," School of Medicine, University of Colorado, 2003 (Abstract Only).
A. Oredsson, "Cognitive Video Surveillance: An ANN/CBR Hybrid Approach", Master of Science in Informatics, Norwegian University of Science and Technology, Submitted Jun. 2007, pp. 1-136.
Polak et al., "Using Automated Analysis of the Resting Twelve-Lead ECG to Identify Patients at Risk of Developing Transient Myocardial Ischaemia—An Application of an Adaptive Logic Network," Physiological Measurement, vol. 18, No. 4, Nov. 1997, pp. 317-325.
Schadow et al., "Discussion Paper: Privacy-Preserving Distributed Queries for a Clinical Case Research Network," IEE International Conference on Data Mining Workshop on Privacy, Security, and Data Mining, 2002 (Abstract).
William E. Souder, "Analytical Effectiveness of Mathematical Models for R&D Project Selection," Management Science, vol. 19, No. 8, Application Seires, Apr. 1973, pp. 907-923 (Abstract).
N. Siebel et al., "The Advisor Visual Surveillance System", Applications of Computer Vision '04, Prague, May 16, 2004, pp. 103-111.
E. A. Silver, "An Overview of Heuristic Solution Methods," The Journal of the Operational Research Society, vol. 55, No. 9, Sep. 2004, pp. 936-956 (Abstract).
Shelfer, et al., "Smart Card Evolution," Communications of the ACM, Jul. 2002, pp. 83-88, vol. 45, No. 7, ACM (Abstract Only).
Adams, et al., "Positive Patient Identification: A Practical Solution to a Challenging Problem," Toward an Electronic Patient '97, Conference and Exposition, Proceedings, PT. vol. 3, 1997, Abstract Only.
Chatfield, "Marketing an HMO by 'Smart' ID Cards With Patient History on an Electronic Medical Record", Proceedings, Toward an Electronic Patient Record '96, Twelfth International Symposium on the Creation of Electronic Health Record System and Global Conference on Patient Cards, PT. vol. 1, 1996, Abstract Only.
Gabrieli, "Guide for Unique Healthcare Identifier Model", Journal of Clinical Computing, vol. 21, No. 5, 1993, Abstract Only.
Goehring, "Identification of Patients in Medical Databases—Soundex Codes Versus Match Code", Medical Informatics, vol. 10, No. 1, pp. 27-34, Jan.-Mar. 1985, Abstract Only.
Wang, "A Cobra-Based Object Framework With Patient Identification Translation and Dynamic Linking. Methods for Exchanging Patient Data", Methods of Information in Medicine, vol. 38, No. 1, Mar. 1999, Abstract Only.
U.S. Appl. No. 12/829,886, Specification filed Jul. 2, 2010, Friedlander et al.
U.S. Appl. No. 12/907,346: Examiner's Answer dated Aug. 28, 2013.
B. Welsh et al., "Effects of Improved Street Lighting on Crime," September 24, 2008, Campbell Systematic Reviews, The Campbell Collaboration, pp. 1-54.
B. Hall et al., "Identifying Age, Cohort and Period Effects in Scientific Research Productivity: Discussion and Illustration Using Simulated and Actual Data on French Physicists", Jun. 26, 2005, Economics of Innovation and New Technology, Taylor and Francis Journals, vol. 16 (2), pp. 1-29.
U.S. Appl. No. 12/907,346 Decision on Appeal Mailed April 1, 2016.
U.S. Appl. No. 12/907,346 Examiner's Answer dated Nov. 29, 2017.

\* cited by examiner

COHORT-BASED PREDICTION OF A FUTURE EVENT

BACKGROUND

The present disclosure relates to the field of computers, and specifically to the use of computers in event monitoring. Still more particularly, the present disclosure relates to the use of computers in utilizing cohorts to predict that a single entity will experience a particular future event.

A bit array is defined as an array structure that stores individual bits. Each individual bit can be associated with a particular characteristic or condition. For example, a particular bit in a bit array can be used to describe whether a particular entity described by the bit array has a particular disease, has purchased a particular product, has taken a particular medical test, etc. These values/characteristics/conditions can be accessed using a bit array index (also called a bitmap index), which associates a specific characteristic/condition to a specific bit location in the bit array.

SUMMARY

A processor-implemented method, computer program product, and/or computer system predicts an occurrence of a future event. A first bit array, which describes characteristics of a single entity while experiencing a first event, is generated using values received from a set of physical test devices. After the first single entity experiences a different second event, a second bit array is generated from another set of physical test devices. The second bit array describes characteristics of an event cohort, which is made up of entities, other than the single entity, which also experience the second event, but which never experienced the first event. When another single entity experiences the first event, a determination is made as to whether that other single entity has characteristics from both the first bit array and the second bit array. If so, a prediction is made that the other single entity will also experience the second event.

DETAILED DESCRIPTION

Figure 1:
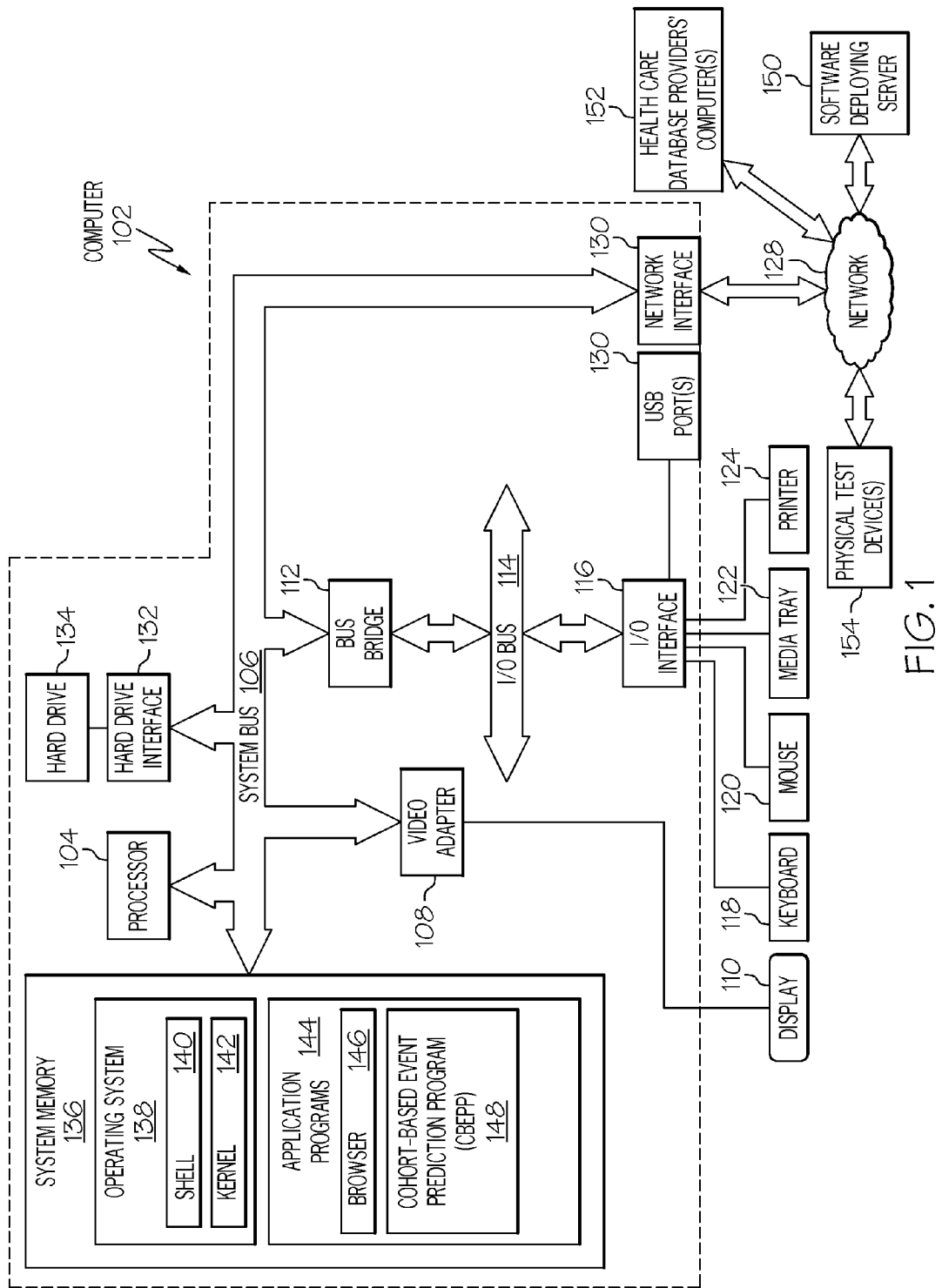
FIG. 1 depicts an exemplary computer in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150, health care database providers' computer(s) 152, and/or physical test device(s) 154.

Computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a cohort-based event prediction program (CBEPP) 148. CBEPP 148 includes code for implementing the processes described below, including those described in FIG. 2. In one embodiment, computer 102 is able to download CBEPP 148 from software deploying server 150, including in an on-demand basis, wherein the code in CBEPP 148 is not downloaded until needed for execution. Note further that, in one embodiment of the present invention, software deploying server 150 performs all of the functions associated with the present invention (including execution of CBEPP 148), thus freeing computer 102 from having to use its own internal computing resources to execute CBEPP 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
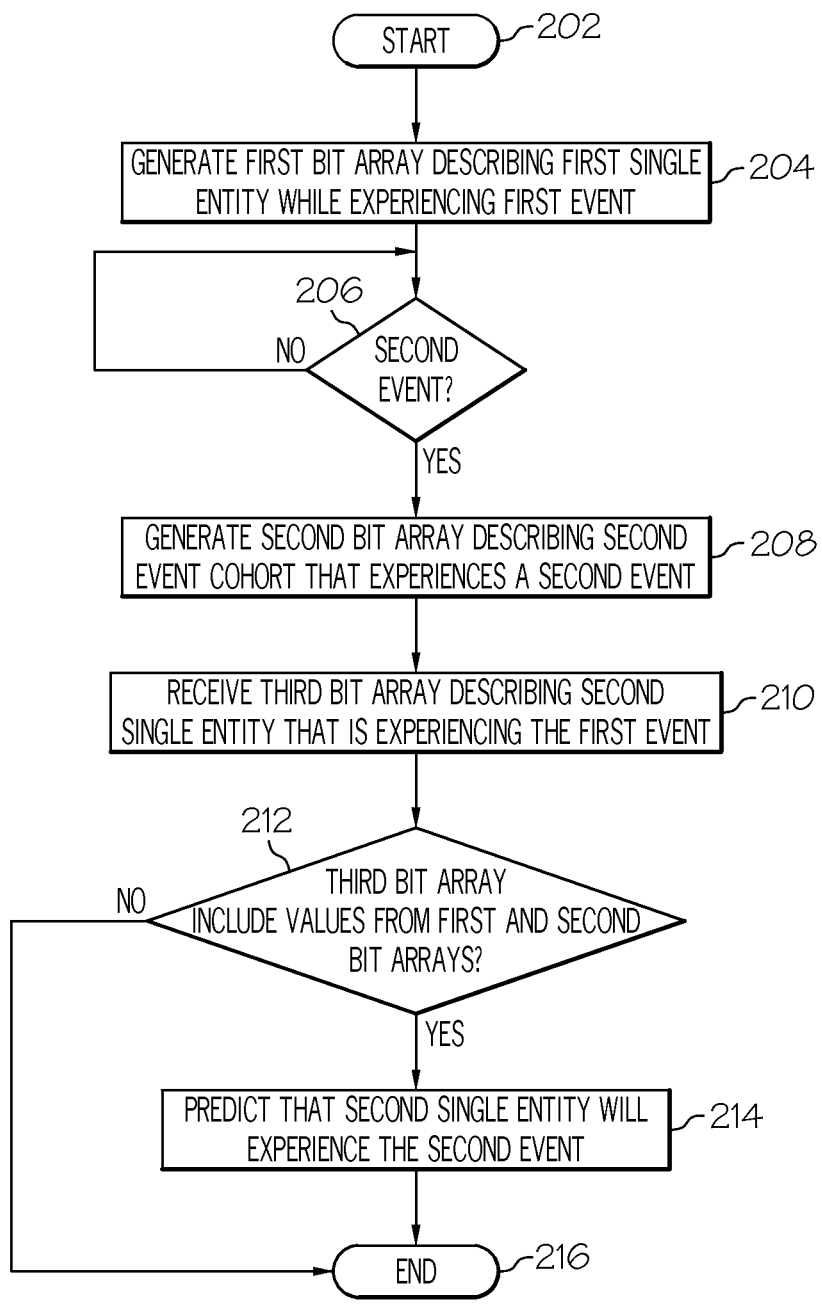
FIG. 2 is a high level flow chart of one or more exemplary steps taken by a processor to predict an occurrence of future event.
Figure 3:
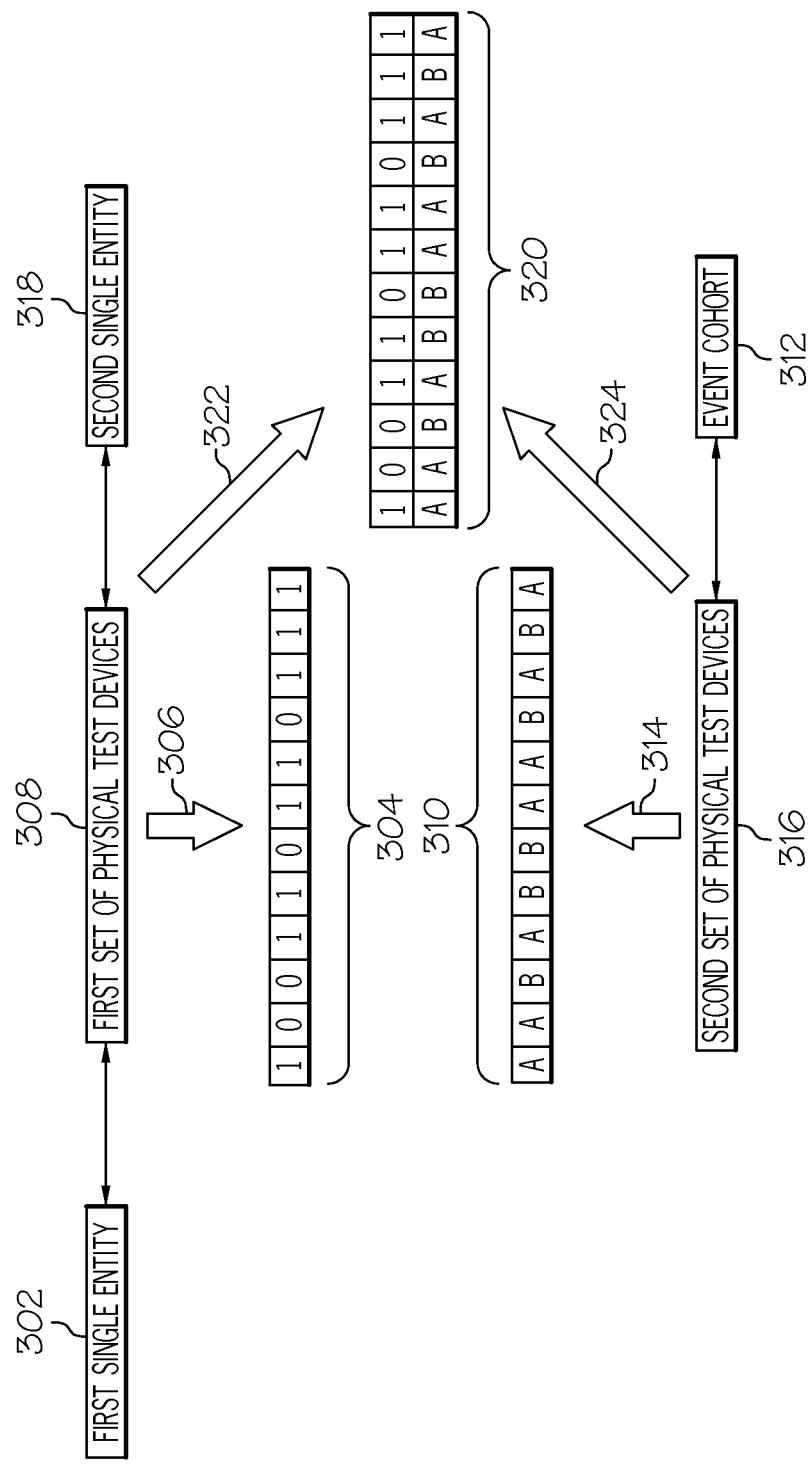
FIG. 3 depicts a relationship among entities, test devices, and bit arrays.

Referring now to FIG. 2, a high level flow chart of one or more exemplary steps taken by a processor to predict an occurrence of future event is presented. After initiator block 202, a processor generates a first bit array, as described in block 204. This first bit array comprises a first set of values that describes a first set of characteristics of a first single entity when said first single entity is experiencing a first event. For example, assume that a cancer patient is receiving chemotherapy. As represented in FIG. 3, in this example the cancer patient is the first single entity 302, and receiving the chemotherapy is the first event. The first bit array 304 is specific for this first single entity 302 (the cancer patient), and holds bits that describe outputs 306 from a specific set of physical test devices, such as a gene analyzer (e.g., equipment that identifies particular genes using a microarray machine using bacterial/protein binding), a computed tomography (CT) scanner (which produces a visualization of a structure), a blood analyzer (e.g., equipment that automatically detects/determines oxygen saturation level, blood cell anomalies, etc. in blood or serum), etc. Note that, in this example, the output 306 (e.g., test results) from this specific set of physical test devices is unaffected by the medical treatment (i.e., chemotherapy). As such, the processor will select the specific set of physical test devices (i.e., the gene analyzer, the CT scanner, and the blood analyzer) as the first set of physical test devices 308, since the first set of characteristics (described by these devices' outputs) do not cause the first event. That is, even though the CT scanner may recognize a cancerous tumor, having this tumor is not the first event in one embodiment. Rather, it is the taking of the chemotherapy that is the first event in this embodiment. In another embodiment, however, having the medical condition (i.e., having the tumor) is the first event. Note that in either embodiment (in which the event is either 1) the medical condition or 2) the treatment of the medical condition), the first set of physical test devices 308 do not generate data that describes the first event itself. Similarly, the first event does not directly cause the characteristics that are measured/detected by the first set of physical test devices 308. Thus, the data generated by the first set of physical test devices 308 does not describe, nor is it the result of, the first event.

With reference now to query block 206 in FIG. 2, a determination is made that the first single entity has experienced a second event subsequent to the first event. Continuing with the patient example above, this second event may be a heart attack. Thus, the processor, by accessing the health care database providers' computer(s) 152 (shown in FIG. 1) can identify that the first event was taking the chemotherapy (medical treatment) and that the second event was the heart attack.

As described in block 208, the processor then generates a second bit array. As depicted in the example shown in FIG. 3, this second bit array 310 contains a set of values that identifies a set of characteristics of an event cohort 312. This event cohort 312 is made up of other entities (e.g., other patients) that have also experienced the second event (a heart attack in this example). Note, however, that members of this event cohort (i.e., the multiple other entities) never experienced the first event (taking chemotherapy). Note also that the set of values that populate the second bit array represent the output 314 of a second set of physical test devices 316, which is functionally different from the first set of physical test devices 308. For example, while the first set of physical devices 308 may be a gene analyzer, a CT scanner, and a blood analyzer, the second set of physical devices 316 may be an audiometer, an electroencephalograph (EEG) machine that traces brainwaves, a body-core thermometer (e.g., a swallow-able thermometer that can be externally read to monitor a patient's core body temperature), etc. Note that one or more of the physical test devices (308 or 316) may be non-medical test devices, such as a pedometer (to measure how far a person has walked), a radio frequency identifier (RFID) or global positioning system (GPS) based personal location monitor, etc. Note that the second set of characteristics alone do not cause the second event. For example, characteristics measured by the EEG machine and thermometer do not cause a heart attack. Note also that no shared common characteristics are represented in both the first bit array 304 and the second bit array 310 (as emphasized by the first bit array 304 containing 1s and 0s, while the second bit array 310 contains a's and b's). That is, in the example described, only results of the gene analyzer, the CT scanner, and the blood analyzer are represented in the first bit array 304, while only audiometric, EEG and thermometer readings are represented in the second bit array 310.

Note that in one embodiment, the processor time shifts the second bit array before the second event to form a time-shifted second bit array. That is, rather than taking readings from the second set of physical test devices at the time of the second event (e.g., the heart attack), previously stored readings from the second set of physical test devices, which were taken before the heart attack, are retrieved (i.e., before some predetermined length of time before the second event). Thus, this time-shifted second bit array represents characteristics that are associated with the event cohort before the second event occurs.

In one embodiment, the processor time shifts the second bit array after the second event to form a time-shifted second bit array. That is, rather than taking readings from the second set of physical test devices at the time of the second event (e.g., the heart attack), the processor waits some predetermined length of time after the second event (e.g., the heart attack) and then retrieves readings from the second set of physical test devices. Thus, this time-shifted second bit array represents characteristics that are associated with the event cohort after the second event occurs. By time shifting the second bit array before and/or after the second event, new correlations between the second event and time-varied readings from the second set of physical test devices are made, thus leading to refined/revised hypotheses regarding the cause of the second event, particularly when viewed in the context of the first event's presence or absence.

In one embodiment, the processor identifies an event characteristic that is associated with a third event. The third event occurs contemporaneously with the second event. However, the third event has been predetermined to be unrelated to the second event. For example, assume that the second bit array for the event cohort includes bits that represent one of the characteristics of a person/entity experiencing the second event (e.g., a heart attack in the example presented herein). However, the processor may determine that these characteristics were actually caused by an unrelated event, such as having a chest cold. In order to "clean up" the second bit array, the processor removes any bit from the second bit array that describes the event characteristic that is associated with only the third event.

With reference now to block 210 in FIG. 2, the processor then receives a third bit array that describes characteristics of a second single entity (i.e., another patient in the example given above, as represented in FIG. 3 as the second single entity 318) that is experiencing the first event (i.e., taking the chemotherapy, as described in the example above). As described in query block 212 of FIG. 2, a determination is then made as to whether this third bit array includes values (representing particular characteristics of this second single entity) that are found in both the first bit array and the second bit array. Note that the first bit array and the second bit array hold values that are mutually exclusive, since they represent outputs from functionally different test devices. Nonetheless, if a patient has characteristics represented by both the first bit array and the second bit array, then a predication is made that this patient will also experience the second event (e.g., will suffer a heart attack) at a future time (block 214). Thus, the present system/process combines current states (i.e., characteristics/outputs associated with the first event) with future states (i.e., characteristics/outputs associated with the second event) to create a hybrid bit array, which can predict that the second event will occur, or at least provides a new hypothesis regarding the cause of the second event.

The third bit array described in query block 212, and resulting in the activity described in block 214, includes values from both the first and second bit arrays. Thus, in the exemplary embodiment depicted in FIG. 3, the third bit array 320 is generated from output 322 from the first set of physical test devices 308 and the output 324 from the second set of physical test devices 316. In the example shown in FIG. 3, the values found in the third bit array 320 are exactly the same as those found in the first bit array 304 and the second bit array 310. In another embodiment, however, the third bit array 320 contains some predetermined percentage of bit values found in the first bit array 304 and the second bit array 310. For example, if there is an 80% match between the first bit array 304 and the top row of the third bit array 320, and/or there is a 90% match between the second bit array 310 and the bottom row of the third bit array 320, this matching level is deemed adequate to support the prediction/ hypothesis described herein that the second single entity 318 will experience the second event in the future.

In one embodiment, the level of matching provides a likelihood that the second event will occur. For example, a 90% match between the third bit array 320 with the first bit array 304 and the second bit array 314 makes the likelihood of the second single entity experiencing the second event more likely than if there were only an 80% match.

In one embodiment, the level of matching provides a time frame in which the second event will likely occur. For example, assume that the first single entity experienced the second event one year after he experienced the first event. A 100% match between the third bit array 320 with the first bit array 304 and the second bit array 314 makes it likely that the second single entity 318 will experience the second event within a year. Alternatively, a 90% match makes it likely that the second event will occur within two years, while an 80% match makes it likely that the second event will occur with five years. These likelihoods (both event and temporal) are based on the combined similarity between the second single entity 318 and the first single entity 302 and the event cohort 312. These likelihoods begin as hypotheses, which can later be confirmed with case studies.

Returning to FIG. 2, the process ends at terminator block 216.

Note that in one embodiment, the processor has determined that the first event and the second event are different types of events (e.g., the first event is the receipt of pharmaceutical treatments and the second event is a heart attack). Nonetheless, in this embodiment the processor establishes a relationship between the first event and the second event through use of a Bayesian algorithm, which establishes a correlation between the first event and the second event based on common entities that experience the first event and the second event. This relationship is then used to bolster (reinforce) the hypothesis/prediction that the second single entity will experience the second event, as described above.

In an exemplary Bayesian analysis, assume that H represents the hypothesis that the second single entity will have a same increased chance of having a heart attack as the first single entity, and D represents that the second single entity has the same attributes (depicted in the first bit array) as the first single entity. This results in the Bayesian probability formula of:

$$P(H \mid D) = \frac{P(D \mid H) * P(H)}{P(D)}$$

where:
P(H|D) is the probability that a second single entity will have an increased likelihood of experiencing a heart attack (H) given that (I) the second single entity has the same attributes (both medical and non-medical) as the first single entity (D);

P(D|H) is the probability that, if the second single entity has an increased chance of having a heart attack, the second single entity will have the same attributes as the first single entity (i.e., even if the hypothesis P(H|D) is true, the two single entities may not have the exact same attributes);

P(H) is the probability that the second single entity will have an increased likelihood of having a heart attack regardless of any other information/facts; and P(D) is the probability that the second single entity will have the same non-linear attributes as the first single entity regardless of any other information/facts.

For example, assume that past studies about entities similar to the first and second single entities show that any entity (patient) will have a higher heart attack rate relative to the group of unrelated patients 50% of the time (P(H)=50%). Assume further that the measured/deduced odds of two single entities having the same attributes (both medical and non-medical) are 6 out of 10 (P(D)=60%). Finally, assume that past studies have shown that two single entities having the same increased heart attack levels will have all of the same shared attributes 80% of the time (P(D|H)=80%). According to these values, the probability that the second single entity will have an increased likelihood of having a heart attack is therefore 66%:

$$P(H \mid D) = \frac{.80 * .50}{.60} = .66$$

However, if past studies have shown that two similar entities having the same increased likelihood of having a heart attack have all of the same shared attributes (i.e., the first bit array is the same for both the first and second entities) 100% of the time (P(D|H)=100%), then the probability that the second single entity will have an increased level of cancer is now 83%:

$$P(H \mid D) = \frac{1.0 * .50}{.60} = .83$$

Note that in one embodiment, the first event may be a first medical diagnosis (e.g., diagnosing the patient as having cancer), while the second event may be a second medical diagnosis (e.g., diagnosing the patient as having heart disease). The same processes described herein are used to predict that a second single entity (as described above) will also be diagnosed with a heart disease, assuming that the bit array values described herein are in line with the process/ examples presented above.

As described herein, one embodiment of the present invention refines the predictive power of the first bit array (when associated with a first event) with the correlation power of the second bit array (when associated with a second event). This refinement not only creates a more accurate prediction of whether the second event will occur, but also creates previously undeveloped hypotheses regarding the relationship and/or causation of the second event with respect to the first event.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method comprising:
   a processor generating a first bit array, wherein the first bit array comprises a first set of values that describes a first set of characteristics of a first single entity when said first single entity experiences a first event, wherein the processor receives the first set of values as electronic signals from a first set of physical test devices, wherein the first set of characteristics do not cause the first event, wherein the first set of values generated by the physical test devices does not describe the first event, and wherein the first set of values is not a result of the first event;
   the processor generating a second bit array, wherein the second bit array comprises a second set of values that identifies a second set of characteristics of an event cohort, wherein the event cohort is made up of multiple other entities that experience a second event, wherein the second event includes a medical condition, wherein the multiple other entities never experienced the first event, wherein the processor receives the second set of values from a second set of physical test devices that is functionally different from the first set of physical test devices, wherein the second set of characteristics alone do not cause the medical condition, and wherein no shared common characteristics are represented in both the first bit array and the second bit array;
   the processor receiving a third bit array that describes characteristics of a second single entity that is experiencing the first event;
   the processor determining that the third bit array comprises values from the first bit array and the second bit array;
   the processor determining a percentage of bits from the third bit array that match bits from the first bit array and the second bit array;
   in response to the processor determining that the percentage is at a first predefined level, the processor predicting that the second single entity will experience the medical condition at a first future time;
   in response to the processor determining that the percentage is at a second predefined level, the processor predicting that the second single entity will experience the medical condition at a second future time, wherein the first predefined level is greater than the second predefined level, and wherein the first future time is reached before the second future time; and
   in response to the processor determining that the percentage is at the second predefined level, administering a medical pharmaceutical treatment for the medical condition to the second single entity at the first future time, wherein the second event further comprises administering the medical pharmaceutical treatment to the second single entity for the medical condition.

2. The method of claim 1, further comprising:
   the processor time shifting the second bit array before the second event to form a time-shifted second bit array, wherein the time-shifted second bit array represents characteristics that are associated with the event cohort before the second event occurs.

3. The method of claim 1, further comprising:
   the processor time shifting the second bit array after the second event to form a time-shifted second bit array, wherein the time-shifted second bit array represents characteristics that are associated with the event cohort after the second event occurs.

4. The method of claim 1, further comprising:
   the processor determining that outputs from a specific set of physical test devices are unaffected by the medical pharmaceutical treatment; and
   the processor selecting the specific set of physical test devices as the first set of physical test devices.

5. The method of claim 1, further comprising:
   the processor identifying an event characteristic that is associated with a third event, wherein the third event has been predetermined to be unrelated to the second event, and wherein the third event occurs contemporaneously with the second event; and the processor removing any bit from the second bit array that describes the event characteristic that is associated with the third event.

6. The method of claim 1, further comprising:

the processor determining that the first event and the second event are different types of events; and the processor establishing a relationship between the first event and the second event through use of a Bayesian algorithm that establishes a correlation between the first event and the second event based on common entities that experience the first event and the second event.

7. The method of claim 1, further comprising:

the processor determining that the third bit array comprises all values from the first bit array and all values from the second bit array; and the processor predicting, based on the third bit array comprising all values from the first bit array and all values from the second bit array, that the second single entity will experience the second event at the first future time.

8. A method comprising:

a processor generating a first bit array, wherein the first bit array comprises a first set of values that describes a first set of characteristics of a first single entity when said first single entity experiences a first event, wherein the processor receives the first set of values as electronic signals from a first set of physical test devices, wherein the first set of characteristics do not cause the first event, wherein the first event is a medical pharmaceutical treatment, wherein the first set of values generated by the physical test devices does not describe the first event, and wherein the first set of values is not a result of the first event;

the processor determining that outputs from a specific set of physical test devices are unaffected by the medical pharmaceutical treatment;

the processor selecting the specific set of physical test devices as the first set of physical test devices;

the processor generating a second bit array, wherein the second bit array comprises a second set of values that identifies a second set of characteristics of an event cohort, wherein the event cohort is made up of multiple other entities that experience a second event, wherein the second event comprises a medical condition, wherein the multiple other entities never experienced the first event, wherein the processor receives the second set of values from a second set of physical test devices that is functionally different from the first set of physical test devices, wherein the second set of characteristics alone do not cause the second event, and wherein no shared common characteristics are represented in both the first bit array and the second bit array;

the processor receiving a third bit array that describes characteristics of a second single entity that is experiencing the first event;

the processor determining that the third bit array comprises values from the first bit array and the second bit array; and in response to the processor determining that the third bit array comprises values from the first bit array and the second bit array, administering a medical pharmaceutical treatment to the second single entity for the medical condition, wherein the second event further comprises the medical pharmaceutical treatment for the medical condition.

9. A method comprising:

a processor generating a first bit array, wherein the first bit array comprises a first set of values that describes a first set of characteristics of a first single entity when said first single entity experiences a first event, wherein the processor receives the first set of values as electronic signals from a first set of physical test devices, wherein the first set of characteristics do not cause the first event, wherein the first event is a medical treatment, wherein the first set of values generated by the physical test devices does not describe the first event, and wherein the first set of values is not a result of the first event;

the processor generating a second bit array, wherein the second bit array comprises a second set of values that identifies a second set of characteristics of an event cohort, wherein the event cohort is made up of multiple other entities that experience a second event, wherein the second event comprises a medical condition, wherein the multiple other entities never experienced the first event, wherein the processor receives the second set of values from a second set of physical test devices that is functionally different from the first set of physical test devices, wherein the second set of characteristics alone do not cause the second event, and wherein no shared common characteristics are represented in both the first bit array and the second bit array;

the processor identifying an event characteristic that is associated with a third event, wherein the third event has been predetermined to be unrelated to the second event, and wherein the third event occurs contemporaneously with the second event; and the processor removing any bit from the second bit array that describes the event characteristic that is associated with the third event;

the processor receiving a third bit array that describes characteristics of a second single entity that is experiencing the first event;

the processor determining that the third bit array comprises values from the first bit array and the second bit array; and in response to the processor determining that the third bit array comprises values from the first bit array and the second bit array, administering a pharmaceutical treatment to the second single entity for the medical condition, wherein the second event further comprises the pharmaceutical treatment for the medical condition.

* * * * *